(12) United States Patent
Pilukaitis et al.

(10) Patent No.: US 6,438,007 B1
(45) Date of Patent: Aug. 20, 2002

(54) CONTROL CIRCUIT FOR PARALLELING POWER SUPPLIES AND METHOD OF OPERATION THEREOF

(76) Inventors: Raymond W. Pilukaitis, 7422 Hardwick Dr., Garland, TX (US) 75044; Carl M. Wildrick, 1010 Seminary Ridge, Garland, TX (US) 75043

(*) Notice: Subject to any disclaimer, the term of this patent is extended or adjusted under 35 U.S.C. 154(b) by 0 days.

(21) Appl. No.: 09/563,977

(22) Filed: May 3, 2000

(51) Int. Cl.[7] ............................. H02M 7/00; H02M 1/12
(52) U.S. Cl. ............................................. 363/65; 363/50
(58) Field of Search .............................. 363/65, 68, 69, 363/71, 50; 307/82, 52, 44

(56) References Cited

U.S. PATENT DOCUMENTS

| | | | |
|---|---|---|---|
| 4,371,919 A | | 2/1983 | Andrews et al. ............... 363/65 |
| 4,441,032 A | * | 4/1984 | Sakurai et al. ................. 307/82 |
| 4,444,032 A | * | 4/1984 | Sakurai ........................ 307/82 |
| 4,609,828 A | * | 9/1986 | Small ........................... 307/44 |
| 4,727,874 A | * | 3/1988 | Bowers et al. ................ 606/38 |
| 5,036,452 A | | 7/1991 | Loftus .......................... 363/71 |
| 5,986,902 A | * | 11/1999 | Brkovic et al. ................ 363/50 |

OTHER PUBLICATIONS

"Analysis, Design, and Performance Evaluation of Droop Current–Sharing Method" by Brian T. Irving and Milan M. Jovanovic; pp. 235–241: 2000 IEEE No Date.

"A Classification and Evaluation of Paralleling Methods for Power Supply Modules" by Shiguo Luo, X. Ye, R. Lin and Fred C. Lee; 11 pages; 1998 No Date.

"Paralleling Supplies via Various Droop Methods" by Cliff Jamerson and Chuck Mullett; pp. 68–76; Apr. 1994.

"Investigation of the Output Droop Characteristics of Parallel–Connected DC–DC Converters" by Issa Batarseh, Kasemsan Siri and Henry Lee; pp. 1342–1351; 1994.

* cited by examiner

*Primary Examiner*—Rajnikant B. Patel

(57) ABSTRACT

A control circuit for, and method of, allowing the power supply, having a controller and an output current limit, to be operated in parallel with other power supplies and a power supply incorporating the circuit or the method. In one embodiment, the circuit includes: (1) a voltage sense subcircuit, coupled to an output of the power supply, that produces a voltage control signal that is a function of an output voltage of the power supply and a voltage proportional to an output current of the power supply and (2) a current sense subcircuit, coupled to the power supply, that produces a current sense signal that is a function of the output current of the power supply, a combination of the voltage control signal and current control signal employable to modify an output of the controller and thereby regulate said power supply and allow said power supply to continuously operate in a current limit region.

18 Claims, 3 Drawing Sheets

CONTROL CIRCUIT FOR PARALLELING POWER SUPPLIES AND METHOD OF OPERATION THEREOF

TECHNICAL FIELD OF THE INVENTION

The present invention is directed, in general, to power supplies and, more specifically, to a control circuit for paralleling power supplies and a method of operating the same.

BACKGROUND OF THE INVENTION

A power supply is a power processing circuit that converts an input voltage waveform into a specified output voltage waveform. In many applications requiring a stable and well-regulated output, switched-mode power supplies are frequently employed to advantage. Switched-mode power supplies generally include an inverter, a transformer having a primary winding coupled to the inverter, an output circuit coupled to a secondary winding of the transformer, an output filter and a controller. The inverter generally includes a power switch, such as a field-effect transistor (FET), that converts an input voltage to a switched voltage that is applied across the transformer. The transformer generally transforms the voltage to another value. The output circuit generates a desired voltage at the output of the power supply and typically includes an output capacitor that smooths and filters the output voltage for delivery to a load.

In conventional voltage or current mode control, the switching cycle may be divided into a primary interval D (during which the power switch is in the conduction mode) and an auxiliary interval 1-D (during which the power switch is in the non-conduction mode). The modulator, in concert with internal timing and error signals derived from either a voltage or current being monitored, determines when the power switch is conducting or non-conducting. Variations in the error signal serve either to prolong the conduction mode or advance initiation of the non-conduction mode.

Conventional power supplies may provide an output over-current protection capability that keeps their output current from exceeding a rated output current. For example, a conventional power supply may provide a DC output voltage of 48 volts for a DC output current up to a rated value of 12.5 amperes, thereby yielding a maximum rated output power of 600 watts. For this example, as the output current increases beyond 12.5 amperes, the conventional power supply reduces its output voltage while trying to maintain a constant output current of 12.5 amperes.

Component tolerance differences that exist from one power supply to another power supply result in somewhat different values of output currents at the point where over-current protection begins. Therefore, conventional over-current protection schemes are designed from a worst-case standpoint to ensure that power limits are not exceeded. Ideally, the output voltage of a power supply should decrease rapidly to, and remain at, zero as the over-current protection scheme is in operation.

Another problem that occurs in some conventional approaches is that, while the output voltage may initially decrease sharply for a constant output current, it reaches a point above zero volts where the output current begins to increase. The value of this voltage plateau varies due to both component tolerances and over-current protection circuit designs. If this voltage plateau is too high or its slope is too flat, the power and current capability of the power supply can be exceeded.

One approach to increase the output current capability that a single power supply can deliver at a rated voltage is to operate several power supplies in a parallel mode and share the output current load between them. Paralleling of two power supplies to share output current requires that the outputs of the power supplies be conjoined. Unless the output voltages are essentially equal, the power supply with the higher voltage setpoint will attempt to deliver the entire load current until it reaches its output current limit. At this point, the output voltage of this power supply having the initial higher voltage setpoint would be reduced to a point approximately equal to the lower output voltage setpoint of the other power supply. This action is undesirable and may cause a power limit to be exceeded due to a wide variation in current limit setpoints between units.

A conventional approach to resolving this problem involves raising the power supply's output impedance to allow its output voltage to fall below its normally regulated value ("droop") as its output current increases. Component tolerances dictate both the magnitude and the droop of the output voltage for each power supply. In parallel operation, the output current is provided by the power supply having the greatest voltage magnitude. This occurs until the output current demand causes its output voltage to droop toward a value equalling that of a second power supply output voltage that is not yet providing any output current. At this point, the second power supply begins to contribute to the output current; the process continues until all paralleled power supplies contribute some output current to the whole. While this approach allows power supplies to be operated in a parallel mode, excessive output voltage droop may cause the combined output voltage to vary more than is tolerable.

Accordingly, what is needed in the art is a way to simplify the parallel operation of power supplies and provide a better-regulated output voltage.

SUMMARY OF THE INVENTION

To address the above-discussed deficiencies of the prior art, the present invention provides, a control circuit for, and method of, allowing the power supply, having a controller and an output current limit, to be operated in parallel with other power supplies and a power supply incorporating the circuit or the method. In one embodiment, the circuit includes: (1) a voltage sense subcircuit, coupled to an output of the power supply, that produces a voltage control signal that is a function of an output voltage of the power supply and a voltage proportional to an output current of the power supply and (2) a current sense subcircuit, coupled to the power supply, that produces a current sense signal that is a function of the output current of the power supply, a combination of the voltage control signal and current control signal employable to modify an output of the controller and thereby regulate said power supply and allow said power supply to continuously operate in a current limit region.

The present invention introduces, in one aspect, the broad concept of improving the paralleling of power supplies by basing the output voltage control signal on a voltage proportional to the output current of the power supply, rather than solely on a voltage of the output of the power supply. Thus, the control circuit uses the voltage proportional to the output current to provide a more precise droop regulation via the voltage sense subcircuit. Additionally, a more precise determination of a specified maximum output current value, via the current sense subcircuit, allows a more predictable maximum output current value for the power supply. The combination of the more precise droop regulation and predictable maximum output current value facilitates enhanced paralleling of multiple power supplies.

In one embodiment of the present invention, the power supply further includes an isolation transformer having a secondary winding. The voltage control signal is further configured to be a function of a voltage at the secondary winding. The control circuit further improves the paralleling of power supplies by basing the output voltage control signal on the more stable voltage present at the secondary winding of the power supply. This voltage at the secondary winding provides an appropriate supply voltage to both the voltage sense subcircuit and the current sense subcircuit to serve as a bias voltage even when the output voltage of the power supply is below its rated output value.

In one embodiment of the present invention, the voltage sense subcircuit comprises a rectifier that rectifies the voltage at the secondary winding. In an embodiment to be illustrated and described, the rectifier takes the form of a single diode.

In one embodiment of the present invention, the voltage sense subcircuit comprises an error amplifier and employs the voltage at the secondary winding as a bias supply voltage for the error amplifier.

In one embodiment of the present invention, the current sense subcircuit comprises a resistor coupled to the power supply. In a related embodiment, the current sense subcircuit comprises a sensor that forms a portion of a current return path in the power supply. In an embodiment to be illustrated and described, the current sense subcircuit comprises a resistor that forms a portion of a current return path in the power supply.

In one embodiment of the present invention, the circuit further includes first and second isolation diodes coupled to outputs of the current sense subcircuit and the voltage sense subcircuit, respectively. In an embodiment to be illustrated and described, the first and second isolation diodes provide the current sense signal and voltage sense signal to a pulse-width modulator that forms a portion of the controller for the power supply.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
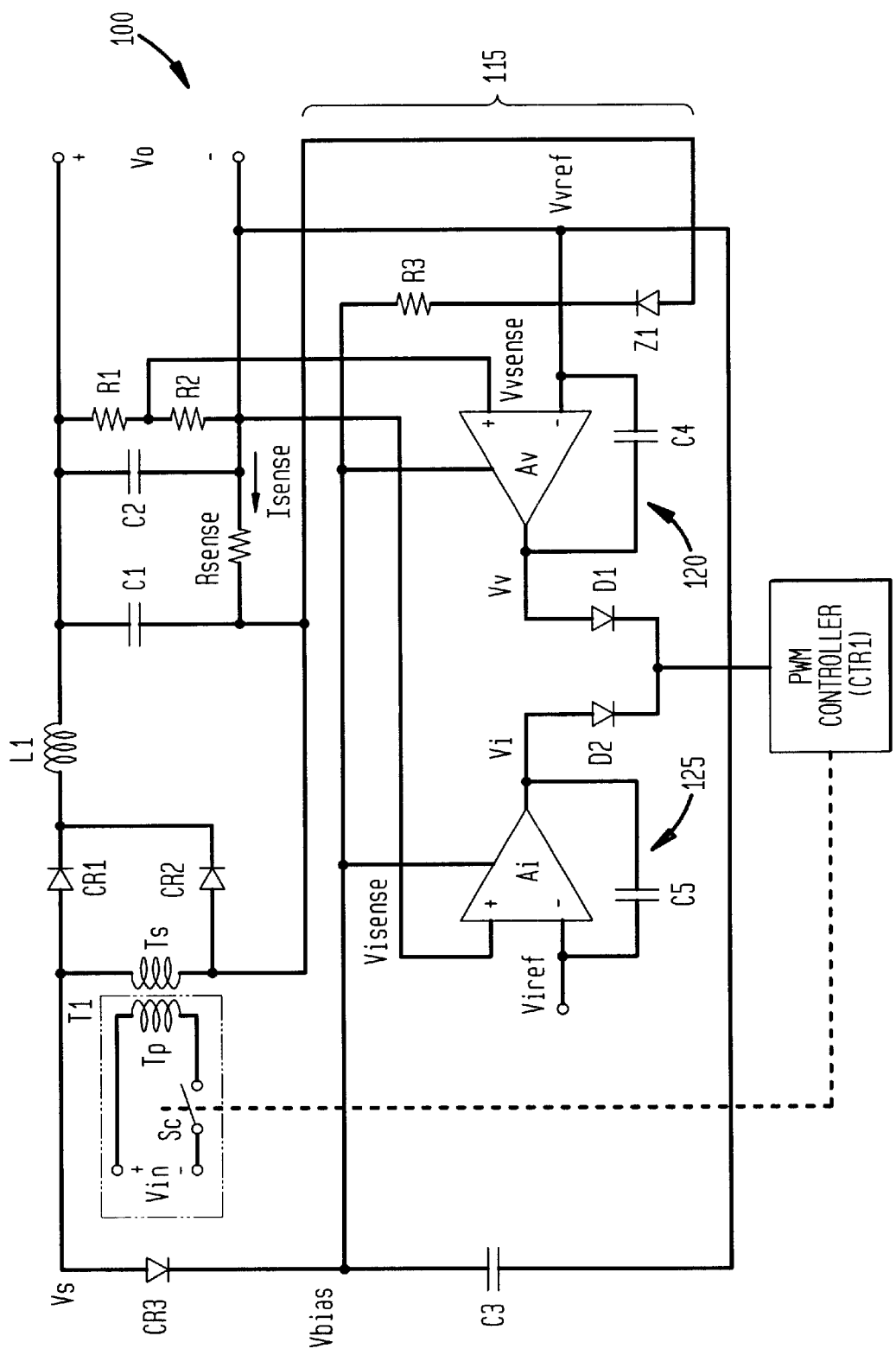
FIG. 1 illustrates a schematic diagram of a power supply containing a control circuit constructed according to the principles of the present invention.

Referring initially to FIG. 1, illustrated is a schematic diagram of a power supply 100 containing a control circuit constructed according to the principles of the present invention. The power supply 100, having an input voltage Vin and an output voltage Vo, includes an input section, an output section and a control circuit 115. The control circuit 115 includes a voltage sense subcircuit 120 and a current sense subcircuit 125. The power supply 100 operates as a forward power converter providing output voltage regulation and output current limiting.

The input section, coupled to an isolation transformer T1 having a primary winding Tp, includes a control switch Sc, which is controlled by a pulse width modulation (PWM) controller CTR1. The PWM controller CTR1 provides general control for the power supply 100, which is enhanced by the actions of the control circuit 115. The output section, coupled to a secondary winding Ts of the isolation transformer T1, includes an inductor L1, first and second rectifiers CR1, CR2 and first and second capacitors C1, C2. The output section further includes a third rectifier CR3 and a third capacitor C3, which provides a bias supply voltage Vbias for use with the control circuit 115. Use of the bias supply voltage Vbias, in the illustrated embodiment, improves the paralleling of power supplies. By basing the operation of the control circuit 115 on the more constant voltage such as that provided by the secondary winding Ts, the control circuit 115 remains operational and allows the power supply 100 to continuously operate even when the power supply 100 is subject to output current limiting and is operating in a current limit region.

The voltage sense subcircuit 120 includes first and second resistors R1, R2, arranged in a voltage divider across the output voltage Vo to provide an output sense voltage Vvsense. The voltage sense subcircuit 120 further includes a third resistor R3 coupled to a zener diode Z1, arranged to provide a voltage-sense reference voltage Vvref. The output sense voltage Vvsense and the voltage-sense reference voltage Vvref direct a voltage error amplifier Av to provide a voltage-sense control voltage Vv. The voltage sense subcircuit 120 further includes a fourth capacitor C4 that is used to stabilize the operation of the voltage error amplifier Av. The voltage sense subcircuit 120 still further includes a first isolation diode D1, which is used to couple the voltage-sense control voltage Vv to the PWM controller CTR1.

The current sense subcircuit 125 includes a current sense resistor Rsense, which senses an output current Isense to develop an output current sense voltage Visense. A current-sense reference voltage Viref is derived from the voltage-sense reference voltage Vvref (not shown) and is used in conjunction with the output current sense voltage Visense to direct a current error amplifier Ai to provide a current-sense control voltage Vi. The current sense subcircuit 125 further includes a fifth capacitor C5 that is used to stabilize the operation of the current error amplifier Ai. The current sense subcircuit 125 still further includes a second isolation diode D2, which is used to couple the current-sense control voltage Vi to the PWM controller CTR1.

In addition to employing a voltage at the secondary winding Ts (e.g., the bias supply voltage Vbias), the voltage sense subcircuit 120 of the illustrated embodiment produces the voltage-sense control voltage Vv as a function of both the output voltage Vo and the output current sense voltage Visense, which is of course proportional to the output current Isense of the power supply 100. Thus, the voltage sense subcircuit 120 uses the output current sense voltage Visense to modify the voltage-sense reference voltage Vvref. This modification of the voltage-sense reference voltage Vvref provides a more precise droop characteristic for the power supply 100, which allows a more predictable parallel operation capability.

The current sense subcircuit 125 includes the current sense resistor Rsense coupled to the output of the power supply 100. The current sense resistor Rsense acts as a sensor that forms a portion of the output current return path in the power supply 100 and is used to measure the output current Isense in the power supply 100, as shown. When the output current Isense is smaller than a specified current limit value for the power supply 100, the current sense voltage Visense is less than the current sense reference voltage Viref. This condition causes the current-sense control voltage Vi to be more negative than the voltage-sense control voltage Vv. As the output current Isense reaches the specified current limit value, the current sense voltage Visense becomes greater than the current sense reference voltage Viref causing the current-sense control voltage Vi to become more positive than the voltage-sense control voltage Vv. This condition may cause the output voltage Vo to decrease sharply as the power supply 100 assumes its current limit operating mode.

The precision of the current sense resistor Rsense may be selected, as a single parameter, to accurately control the specified current limit value for the power supply 100. This allows other power supply components to have much wider tolerances. Precise selection of this single component allows each power supply operating in a parallel situation to exhibit specified current limit values that may be constructed to be as similar to one another as desired. The combination of the more precise droop regulation and predictable maximum output current value facilitates enhanced paralleling of multiple power supplies.

The first and second isolation diodes D1, D2 (which form an exclusive OR circuit) allow the more positive of the two control voltages (voltage-sense control voltage Vv or current-sense control voltage Vi) to control the PWM controller CTR1. Therefore, when the output current of the power supply 100 is below the specified current limit value, the voltage sense subcircuit 120 is used exclusively to maintain the output voltage Vo at its specified value. If the output voltage Vo increases slightly, the voltage-sense control voltage Vv also increases causing the PWM controller CTR1 to reduce the output voltage Vo, as needed. If the output voltage Vo decreases, the opposite control action occurs to restore the output voltage Vo.

Figure 2:
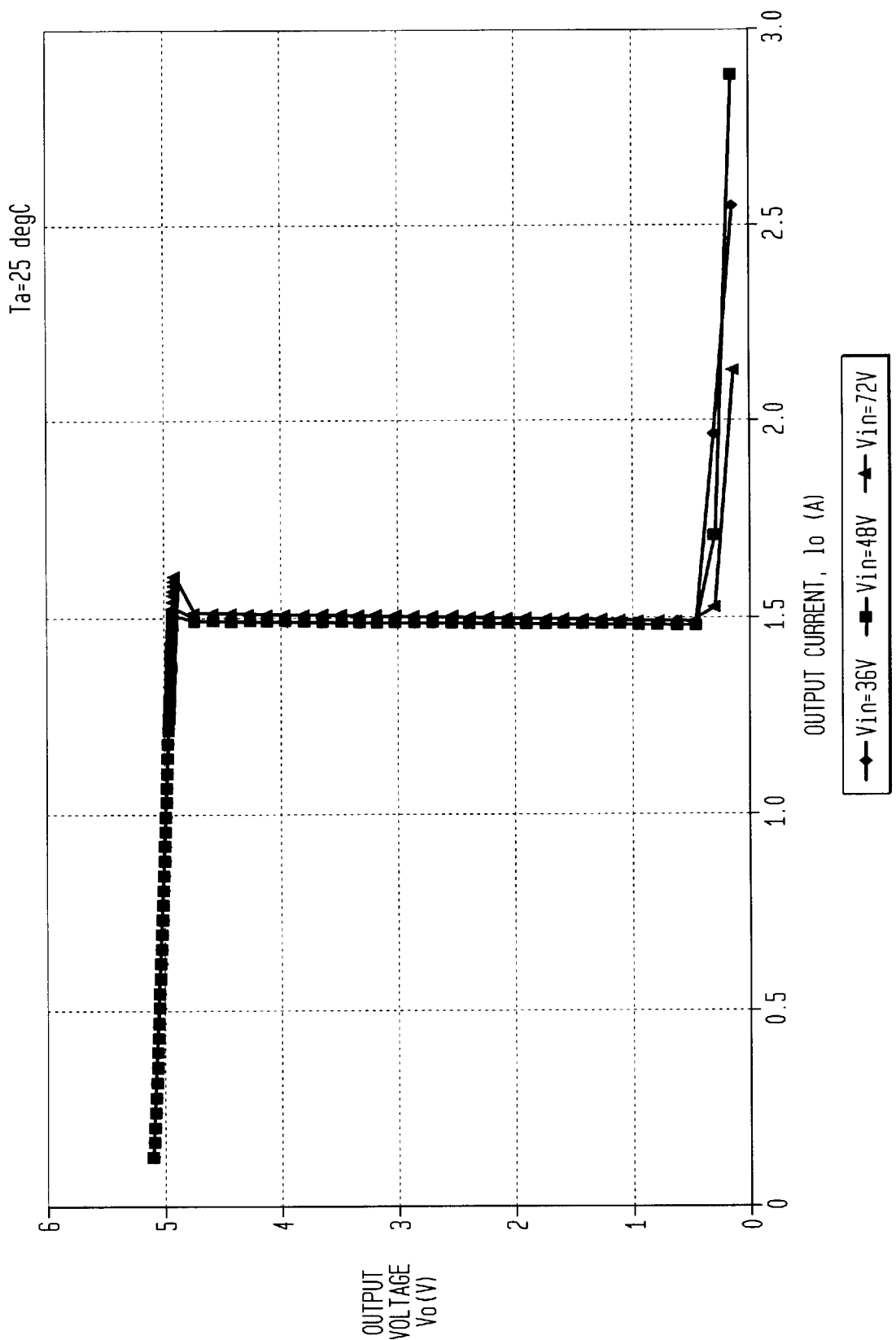
FIG. 2 illustrates a power supply output characteristic demonstrating the operation of the power supply shown in FIG. 1.

Turning now to FIG. 2, illustrated is a power supply output characteristic demonstrating the operation of the power supply 100 shown in FIG. 1. The power supply output characteristic shows three output characteristics for the power supply 100 operating under the three input voltage conditions of 36 volts, 48 volts and 72 volts, respectively. The three output characteristics demonstrate a high level of droop consistency for an output voltage Vo in the normal operating range for an output current Io of up to about 1.5 amperes. The output voltage Vo is seen to have a slightly negative slope as the output current Io increases in this range. As the output current Io reaches the specified current limit value of about 1.5 amperes, the output voltage Vo is seen to exhibit a very steep voltage declivity down to about 0.4 volts. The output voltage Vo in the range of 0.4 volts sufficiently limits the power dissipated by the power supply 100, as desired. This almost ideal power supply output characteristic allows the power supply 100 to be advantageously used in situations requiring the parallel operation of power supplies.

Figure 3:
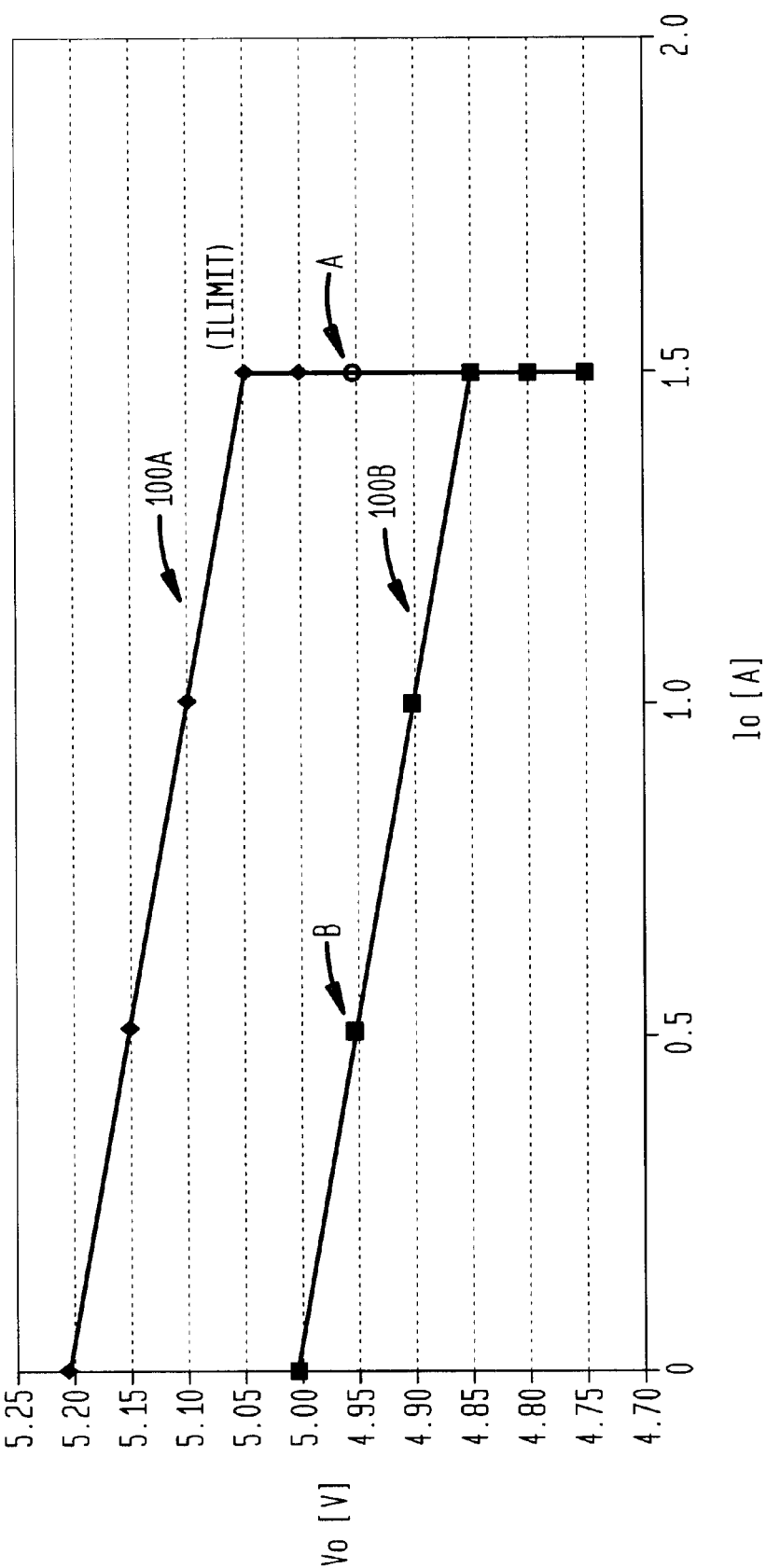
FIG. 3 illustrates droop regulation characteristics demonstrating the parallel operation of first and second power supplies constructed according to the principles of the present invention.

Turning now to FIG. 3, illustrated are droop regulation characteristics demonstrating the parallel operation of first and second power supplies constructed according to the principles of the present invention. More specifically, FIG. 3 delineates first and second operational characteristics 100A, 100B of the first and second power supplies 100A, 100B, respectively. The first and second operational characteristics 100A, 100B are seen to demonstrate essentially identical specified current limit values since the values of their respective current sense resistors are matched to a high degree of precision. Their output voltage Vo values, however, are seen to differ by about five percent due to other component tolerance values. An output load, connected to the parallel combination, requires a load current of 2.0 amperes.

The first power supply delivers an output current Io of 1.5 amperes (shown as operating point A on the specified current limit value) to the output load. The second power supply (operating point B) delivers an additional output current Io of 0.5 amperes to the output load. The output voltage vo of the parallel combination of the first and second power supplies is seen to be 4.95 volts, which is determined by the power supply output characteristic of the second power supply for an output current Io of 0.5 amperes. The present invention advantageously allows the droop requirements of a power supply to be minimized, while still providing appropriate current sharing of the paralleled power supplies without exceeding rated power requirements. Additionally, the present invention allows a power supply to continuously operate in the current limit region (at, for instance, operating point A for the first power supply).

In summary, the present invention introduces the pervasive concept of improving the paralleling of power supplies by basing the output voltage control signal on a voltage proportional to the output current of the power supply, rather than solely on a voltage of the output of the power supply. Thus, the control circuit uses the voltage proportional to the output current to provide a more precise droop regulation via the voltage sense subcircuit. Additionally, a more precise determination of a specified maximum output current value, via the current sense subcircuit, allows a more predictable maximum output current value for the power supply. The combination of the more precise droop regulation and predictable maximum output current value facilitates enhanced paralleling of multiple power supplies.

For a better understanding of power supplies including a variety of topologies, see, Modern DC-to-DC Switchmode Power Converter Circuits, by Rudolph P. Severns and Gordon Bloom, Van Nostrand Reinhold Company, New York, N.Y. (1985). For a better understanding of parallel operation of power supplies, see U.S. Pat. No. 5,036,452, entitled "Current Sharing Control With Limited Output Voltage Range for Paralleled Power Converters," to Loftus, issued on Jul. 30, 1991; U.S. Pat. No. 4,371,919, to Andrews, et al., entitled "Load Distribution Among Parallel DC-DC Converters," issued on Feb. 1, 1983; Paralleling Supplies via Droop Methods, by Jamerson, et al., HFPC, April 1994 Proceedings, pp. 68–76; Investigation of the Output Droop Characteristics of Parallel-Connected DC-DC Converters, by Batarseh, et al., PESC, May 1994 Proceedings, pp. 1342–1351; and A Classification and Evaluation of Paralleling Methods for Power Supply Modules, by Luo, et al., VPEC, 1998 Seminar. The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. A control circuit configured to allow a power supply, having an isolation transformer with a secondary winding, a controller and an output current limit, to be operated in parallel with other power supplies, comprising:

a voltage sense subcircuit, coupled to an output of said power supply, configured to produce a voltage control signal that is a function of an output voltage of said power supply, a voltage at said secondary winding and a voltage proportional to an output current of said power supply; and a current sense subcircuit, coupled to said power supply, configured to produce a current sense signal that is a function of said output current of said power supply, a combination of said voltage control signal and current control signal employable to modify an output of said controller and thereby regulate said power supply and allow said power supply to continuously operate in a current limit region.

2. The circuit as recited in claim 1 wherein said voltage sense subcircuit comprises a rectifier configured to rectify said voltage at said secondary winding.

3. The circuit as recited in claim 1 wherein said voltage sense subcircuit comprises an error amplifier and is configured to employ said voltage at said secondary winding as a bias supply voltage for said error amplifier.

4. The circuit as recited in claim 1 wherein said current sense subcircuit comprises a resistor coupled to said power supply.

5. The circuit as recited in claim 1 wherein said current sense subcircuit comprises a sensor that forms a portion of a current return path in said power supply.

6. The circuit as recited in claim 1 further comprising first and second isolation diodes coupled to outputs of said current sense subcircuit and said voltage sense subcircuit, respectively.

7. A method of allowing a power supply, having an isolation transformer with a secondary winding, a controller and an output current limit, to be operated in parallel with other power supplies, comprising:

producing a voltage control signal that is a function of an output voltage of said power supply, a voltage at said secondary winding and a voltage proportional to an output current of said power supply;

producing a current sense signal that is a function of said output current of said power supply; and modifying an output of said controller with a combination of said voltage control signal and current control signal to modify an output of said controller and thereby regulate said power supply and allow said power supply to continuously operate in a current limit region.

8. The method as recited in claim 7 wherein said producing said voltage control signal comprises rectifying said voltage at said secondary winding.

9. The method as recited in claim 7 wherein said producing said voltage control signal comprises employing said voltage at said secondary winding as a bias supply voltage for an error amplifier.

10. The method as recited in claim 7 wherein said producing said current sense signal comprises deriving said output current from a resistor coupled to said power supply.

11. The method as recited in claim 7 wherein said producing said current sense signal comprises deriving said output current from a sensor that forms a portion of a current return path in said power supply.

12. The method as recited in claim 7 further comprising isolating said voltage sense signal from said current sense signal.

13. A power supply having an output current limit, comprising:

at least one power switch;

an isolation transformer having a primary winding coupled to said at least one power switch;

a rectifier coupled to a secondary winding of said isolation transformer;

a controller coupled to said at least one power switch; and a control circuit for allowing said power supply to be operated in parallel with other power supplies, including:

a voltage sense subcircuit, coupled to an output of said power supply and to an end tap of said secondary winding, that produces a voltage control signal that is a function of an output voltage of said power supply, a voltage at said secondary winding and a voltage proportional to an output current of said power supply;

a current sense subcircuit, coupled to said power supply, that produces a current sense signal that is a function of said output current of said power supply, a combination of said voltage control signal and current control signal employable to modify an output of said controller and thereby control an operation of said at least one power switch to allow said power supply to continuously operate in a current limit region.

14. The power supply as recited in claim 13 wherein said voltage sense subcircuit comprises a rectifier that rectifies said voltage at said secondary winding.

15. The power supply as recited in claim 13 wherein said voltage sense subcircuit comprises an error amplifier and employs said voltage at said secondary winding as a bias supply voltage for said error amplifier.

16. The power supply as recited in claim 13 wherein said current sense subcircuit comprises a resistor coupled to said power supply.

17. The power supply as recited in claim 13 wherein said current sense subcircuit comprises a sensor that forms a portion of a current return path in said power supply.

18. The power supply as recited in claim 13 wherein said circuit further includes first and second isolation diodes coupled to outputs of said current sense subcircuit and said voltage sense subcircuit, respectively.

* * * * *